United States Patent [19]
Leiber

[11] 3,929,380
[45] Dec. 30, 1975

[54] METHOD AND ARRANGEMENT FOR APPLYING OSCILLATING BRAKING PRESSURES TO VEHICLE WHEELS

[75] Inventor: Heinz Leiber, Leimen, Germany

[73] Assignee: Teldix GmbH, Heidelberg, Germany

[22] Filed: Dec. 14, 1973

[21] Appl. No.: 424,803

[30] Foreign Application Priority Data
Dec. 21, 1972 Germany............................ 2262557

[52] U.S. Cl.................... 303/21 F; 188/85; 303/61
[51] Int. Cl.² ........................................... B60T 8/00
[58] Field of Search ........ 188/181, 73.5, 85, 205 A; 303/20, 21, 61, 68

[56] References Cited
UNITED STATES PATENTS

| | | |
|---|---|---|
| 3,499,689 | 3/1970 | Carp et al........................ 303/21 P |
| 3,563,611 | 2/1971 | Sharp............................... 303/21 CF |
| 3,637,264 | 1/1972 | Leiber et al. .................... 303/21 BE |
| 3,642,329 | 2/1972 | Zechnall et al................. 303/21 BE |
| 3,704,043 | 11/1972 | Hickner et al.................. 303/21 BE |
| 3,767,271 | 10/1973 | Grosseau ........................ 303/68 X |

Primary Examiner—Trygve M. Blix
Assistant Examiner—Stephen G. Kunin
Attorney, Agent, or Firm—Spencer & Kaye

[57] ABSTRACT

An arrangement for modulation of the brake pressure of vehicle wheel brakes comprises a modulator connected in the brake pressure feed line for varying the brake pressure and switch device controlling the modulator to oscillate the brake pressure.

12 Claims, 3 Drawing Figures

METHOD AND ARRANGEMENT FOR APPLYING OSCILLATING BRAKING PRESSURES TO VEHICLE WHEELS

BACKGROUND OF THE INVENTION

The invention relates to an arrangement for the modulation of the brake pressure of the wheel brakes of the vehicle wheels.

On braking a vehicle, it is well known that squeaking, or squealing of the brakes can take place and these noises are frequently disturbing. The cause of this squeaking lies in the oscillation of brake disc or brake drum and, possibly, also in oscillation of brake plates and rods initiated by the friction. To reduce this noise, attempts have been made hitherto to select materials for these parts which will damp or remove these oscillations. Unfortunately materials which are particularly suitable in this respect do not have the most advantageous wearing properties.

SUMMARY OF THE INVENTION

It is an object of the invention to find an arrangement with which the brake noise can be avoided.

According to the invention, there is provided an arrangement for modulation of the brake pressure of a wheel brake of a vehicle comprising a modulator connected in a brake pressure line to said wheel brake for varying the brake pressure therein and switch means connected to said modulator for control of said modulator to provide an oscillation of said brake pressure.

BRIEF DESCRIPTION OF THE DRAWINGS

The invention will now be described in greater detail, by way of example, with reference to the drawings, in which.

DESCRIPTION OF THE PREFERRED EMBODIMENTS

The invention basically proposes an arrangement for modulation of the brake pressure of the wheel brakes of a vehicle in which a modulator is connected in the brake pressure feed-line for varying the brake pressure and switch means are provided for controlling the modulator to oscillate the brake pressure.

The modulation of the amplitude of the brake pressure should have as a high a modulation frequency as possible. However the upper limit of this frequency is determined by the inertia of the modulator. Frequencies of the order of magnitude of 100 or 200 Hz are the frequencies in question. The modulation of the brake pressure means that the brake disc or drum is not stressed constantly. Moreover, as a result of the "high frequency" brake pressure modulation, the effective frictional parameter between tires and road is increased so that an increase in the effective brake force can be achieved. The arrangement in accordance with the invention can also be used to achieve only this effect, if, e.g. for example, other measures are adopted to prevent brake squeaking.

The brake pressure modulator may comprise a valve arrangement whose operation is initiated by a pulse generator. The valve arrangement in this case interrupts the brake pressure and causes a pressure reduction once per pulse of the pulse generator, and in the next instant it permits a pressure rise again. The valve arrangement can in this case comprise a combination of an inlet and an outlet valve as is known from anti-lock control technology, or it may comprise a two-way valve. In one switching position of these valves, the brake pressure line is switched through to the wheel brakes and in the other, the pressure line is interrupted and the wheel brake cylinder is connected to a return line or an expansion vessel.

The invention can be used in a particularly cost-saving manner in certain brake systems. In such systems one of these valve arrangements is provided either for use in actual brake operation with the use of a high pressure source or for anti-lock control in systems provided with anti-lock controllers. These valve arrangements can thus be used both for their original purpose and for brake pressure modulation in accordance with the invention.

Since brake squeaking usually occurs at small brake pressures, the effect of the modulator can be suppressed at higher brake pressures if only the elimination of squeaking is desired.

Figure 1:
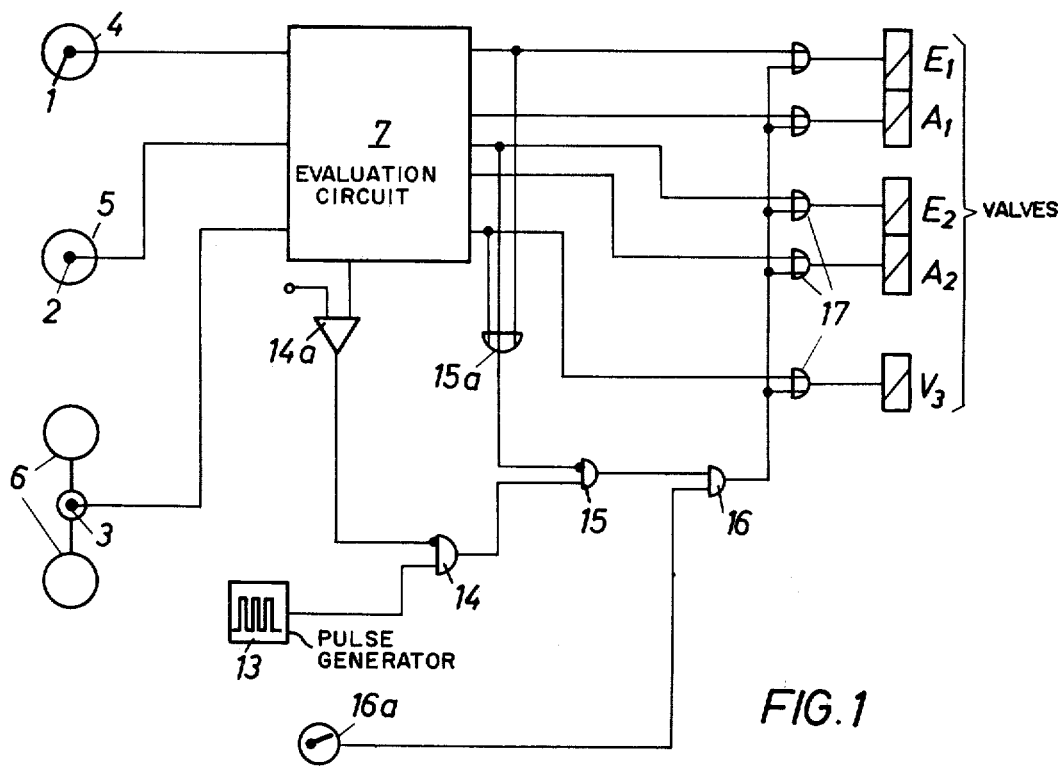
FIG. 1 is a diagram of a brake control system with an anti-lock controller and incorporating a modulation arrangement in accordance with the invention.

Referring now to the drawings, in FIG. 1 the front wheels of a vehicle are indicated at 4 and 5 and the rear wheels are indicated at 6. The front wheels are equipped with sensors 1 and 2 for sensing the speed of the wheels. A common sensor 3 is associated with the rear wheels. An evaluation circuit 7 derives control signals for valves associated with the individual sensors from the wheel speeds sensed by the sensors. The control signals may be formed in any known way. Magnetic valve combinations $E_1A_1$ or $E_2/A_2$, each comprising an inlet valve and an outlet valve, are associated with the sensors 1 and 2 of the wheels 4 and 5. A two-way valve $V_3$ is associated with the sensor 3.

Figure 2:
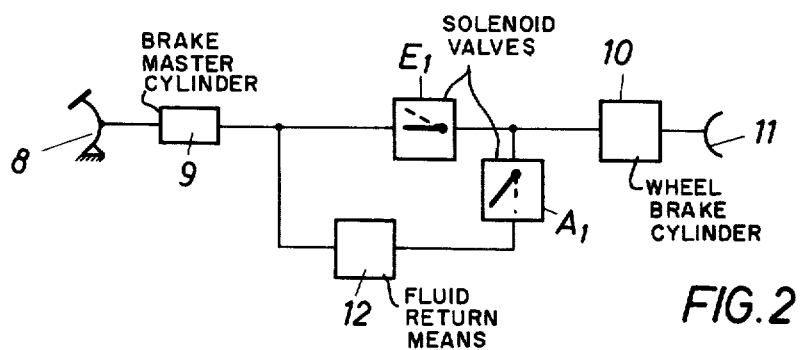
FIG. 2 is the brake medium layout for the control system of FIG. 1.

The arrangement of, for example, the valves $E_1/A_1$ in the brake pressure line is shown in FIG. 2. In this figure, the brake pedal is given the reference numeral 8, the brake master cylinder the reference numeral 9, the wheel brake cylinder the reference numeral 10, the brakes the reference numeral 11 and the return arrangement for return of the brake medium into the main pressure line is given the reference numeral 12. Normally the inlet valve $E_1$ for the brake fluid is open and the outlet valve $A_1$ for the brake fluid is closed.

A changeover of the valves takes place when it is necessary to reduce the brake pressure. Whereas, in the case of this valve combination, it is possible as well to hold the brake pressure constant (e.g. $E_1$ closed, $A_1$ closed), when a two-way valve $V_3$ is used, only a reduction in pressure or an increase in pressure rise is normally possible. The operation of the valves $E_1$, $A_1$, $E_2$, $A_2$ and $V_3$ is initiated by the evaluation circuit 7 when one of the individual wheels or wheel groups has a tendency to lock.

In accordance with this embodiment of the invention, these valves are also used for modulation of the brake pressure for the purposes of reducing squeaking and/or of increasing the frictional parameter between the wheels and road surface. For this purpose the valves are fed with pulses from a pulse generator 13 by way of AND-gates 14 to 16 and OR-gates 17. This pulse sequence causes, during the pulse pauses, a pressure rise and, during the duration of the pulses, a pressure reduction. The frequency of the pulse sequence is so selected that the valve can still follow the control pulses and a substantial pressure reduction, preferably down to zero pressure can take place. An AND-gate 16 and a switch 16a (e.g. the vehicle brake light switch), actuated by the brake pedal, in this case, allows the valves to be connected to the pulse generator 13 only during brake actuation. On the other hand, the pulses used in the operation of the anti-lock controller also prevent brake pressure modulation as a result of their being fed to the AND-gate 15 with inverted input by way of OR-gate 15a. Thus, if one of the valves $E_1$, $E_2$ and $V_3$ respond, the AND-gate 15 is blocked and modulation is prevented. Finally, the AND-gate 14 can be blocked by a signal from a comparator 14a to which a voltage corresponding to the vehicle speed is fed for comparison with a predetermined voltage, to determine if the vehicle speed is above a predetermined value.

Figure 3:
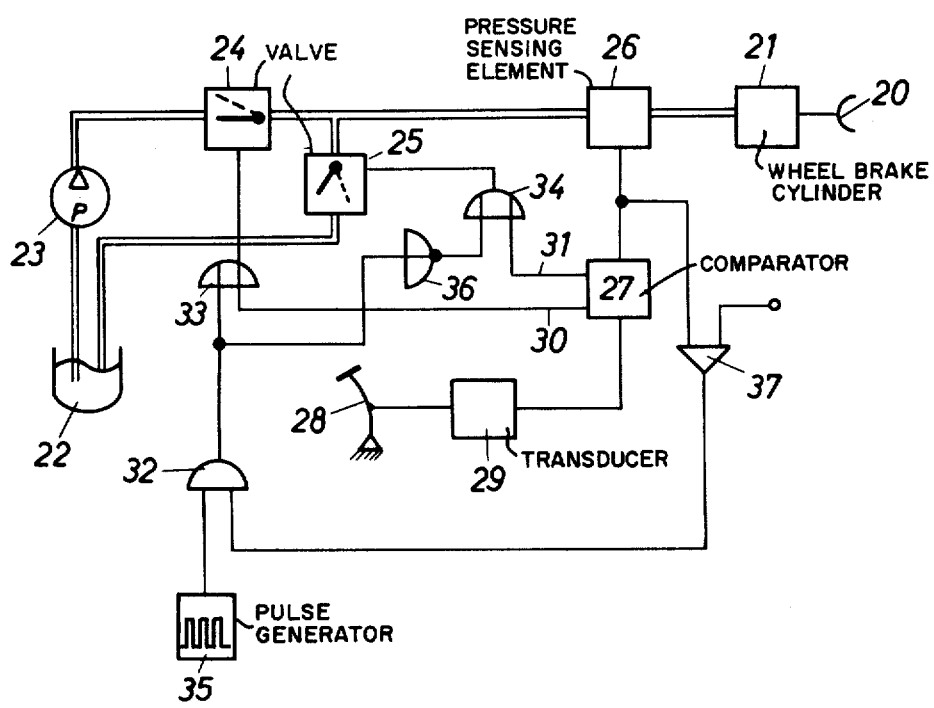
FIG. 3 is a diagram of a full power brake system incorporating a modulation arrangement in accordance with the invention.

In the case of the embodiment of FIG. 3, only one wheel brake 20 with associated wheel brake cylinder 21 is shown. Here a pump 23, connected to a reservoir 22 and pumping pressure medium therefrom, is provided as the pressure generator. The pressure line from the pressure source to the wheel cylinder is normally closed by a valve 24. Further a normally closed outlet valve 25 is connected between the wheel brake cylinder 21 and the reservoir 22; moreover a pressure sensing element 26 is provided in the pressure line. This pressure sensing element produces a voltage corresponding to the pressure in the line and feeds this voltage to a comparator 27, to which is also fed a voltage dependent on the actuation of the vehicle brake pedal 28 and formed in an element 29. If the voltage of the element 29 is larger than that of element 26 actuation of the valve 24 is initiated through line 30. The valve 24 permits the pressure to rise until the desired pressure, indicated by the actuation of the brake pedal 28, has built up at the wheel brake cylinder 21. On the other hand, actuation of the valve 25 is initiated through line 31 and thus the pressure is reduced if the voltage of the pressure sensing element 26 exceeds the voltage of the element 29.

Here the valves 24 and 25 are also used as a modulator to avoid the brake squeaking or to increase the frictional parameter between the vehicle wheels and the road surface. The valves are supplied with a pulse sequence of the generator 35 by way of AND-gate 32 and the OR-gates 33 and 34, whereby during the pulse pauses, the brake pressure is reduced because of the inverted output of an element 36 and during the pulse periods the pressure is increased. The AND-gate 32 and a comparator 37 with a predetermined threshold ensure that the modulation pulses are only effective below a predetermined pressure level.

It will be understood that the above description of the present invention is susceptible to various modifications, changes and adaptations.

What is claimed is:

1. An arrangement for modulation of the brake pressure of a wheel brake of a vehicle, comprising a modulator connected in a brake pressure line to said wheel brake for varying the brake pressure therein; switch means connected to said modulator for controlling said modulator to provide an oscillation of said brake pressure; and a logic circuit connected between said switch means and said modulator for allowing said switch means to operate said modulator only at low vehicle speeds.

2. An arrangement for modulation of the brake pressure of a wheel brake of a vehicle, comprising a modulator connected in a brake pressure line to said wheel brake for varying the brake pressure therein; switch means connected to said modulator for controlling said modulator to provide an oscillation of said brake pressure; and a logic circuit connected between said switch means and said modulator for allowing said switch means to operate said modulator only at low brake pressures.

3. An arrangement as defined in claim 2, wherein said modulator comprises a valve arrangement disposed in said brake line for reducing said brake pressure at said wheel brake for short periods.

4. An arrangement as defined in claim 2, wherein said valve arrangement comprises a two-way valve operable between a first state in which said brake line communicates with a fluid pressure source and a second state in which said brake line is cut off from said pressure source and connected to pressure reduction means.

5. An arrangement as defined in claim 4, wherein said pressure reduction means comprises a brake pressure fluid return line.

6. An arrangement as defined in claim 4, wherein said pressure reduction means comprises an exansion vessel.

7. An arrangement as defined in claim 2, wherein said valve arrangement comprises a valve connecting a high pressure source and said vehicle wheel brake from time to time and also to provide said variation of said brake pressure.

8. A method of modulating the brake pressure of a vehicle wheel brake for eliminating brake squealing, including a brake line and a modulator connected in the brake line for varying the brake pressure therein, comprising the following steps:
   a. applying, during braking, a series of pulses to said modulator by a switch means for effecting a pressure oscillation in the brake line in response to the pulses;
   b. selecting the duration of each pulse and each pulse between pulses to be just sufficiently long for effecting a large-amplitude pressure fluctuation in the pressure line to eliminate brake squealing;
   c. decreasing the pressure in the brake line by an anti-lock means when the associated vehicle wheel shows a tendency to lock; and
   d. preventing, when said wheel shows a tendency to lock, said switch means from operating the modulator by means of a logic circuit connected to the anti-lock means, the switch means and the modulator.

9. A method as defined in claim 8, wherein the steps of decreasing the pressure in the brake line and effecting a pressure oscillation in the brake line includes the step of actuating a valve arrangement comprised in the modulator and including a valve connected to said anti-lock means for causing a brake pressure reduction when said wheel shows a tendency to lock; said valve being connected to said logic circuit for preventing said switch means from operating said valve when said wheel shows a tendency to lock.

10. A method as defined in claim 8, wherein said selecting step includes the step of so choosing the duration of each pulse and each pause between pulses to be just sufficiently long for effecting a pressure drop in the brake line to substantially zero in response to each pulse to cause a large-amplitude pressure fluctuation in the brake line to eliminate brake squealing.

11. A method as defined in claim 10, wherein the pulse repetition frequency is substantially between 100 and 200 Hz.

12. A method as defined in claim 8, wherein the pulse repetition frequency is substantially betweeen 100 and 200 Hz.

* * * * *